United States Patent
Garin et al.

(10) Patent No.: US 6,671,620 B1
(45) Date of Patent: Dec. 30, 2003

(54) METHOD AND APPARATUS FOR DETERMINING GLOBAL POSITION USING ALMANAC INFORMATION

(75) Inventors: Lionel Jacques Garin, Palo Alto, CA (US); Kurt Christian Schmidt, Lawndale, CA (US)

(73) Assignee: SIRF Technology, Inc., San Jose, CA (US)

( * ) Notice: Subject to any disclaimer, the term of this patent is extended or adjusted under 35 U.S.C. 154(b) by 0 days.

(21) Appl. No.: 09/575,492

(22) Filed: May 18, 2000

(51) Int. Cl.$^7$ .................. G01C 21/00; G01S 21/00; G06G 7/78; H04B 7/185
(52) U.S. Cl. .................. 701/213; 701/214; 701/215; 342/357.1; 342/357.12; 342/357.13; 342/357.15; 342/357.09
(58) Field of Search ............... 701/214, 213, 701/215; 342/357.1, 357.12, 357.13, 357.15, 357.09

(56) References Cited

U.S. PATENT DOCUMENTS

| | | | |
|---|---|---|---|
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/360 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,884,041 A | 11/1989 | Walker | 331/57 |
| 4,890,233 A | 12/1989 | Ando et al. | 701/224 |
| 4,894,662 A | 1/1990 | Counselman | 342/357 |
| 4,998,111 A | 3/1991 | Ma et al. | 342/352 |
| 5,014,066 A | 5/1991 | Counselman, III | 342/357 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,172,076 A | 12/1992 | Brown | 331/57 |
| 5,202,829 A | 4/1993 | Geier | 701/215 |
| 5,225,842 A | 7/1993 | Brown et al. | 342/357 |
| 5,293,170 A | 3/1994 | Lorenz et al. | 342/352 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/359 |
| 5,347,536 A | 9/1994 | Meehan | 375/1 |
| 5,379,224 A | 1/1995 | Brown et al. | 701/215 |
| 5,402,347 A | 3/1995 | McBurney et al. | 701/213 |
| 5,416,712 A | 5/1995 | Geier et al. | 701/216 |
| 5,418,538 A | 5/1995 | Lau | 342/357 |
| 5,420,592 A | 5/1995 | Johnson | 342/357 |
| 5,420,593 A | 5/1995 | Niles | 342/375 |
| 5,440,313 A | 8/1995 | Osterdock et al. | 342/352 |
| 5,450,344 A | 9/1995 | Woo et al. | 701/213 |

(List continued on next page.)

FOREIGN PATENT DOCUMENTS

| | | |
|---|---|---|
| EP | WO 90/11652 | 10/1990 |
| EP | 0511741 | 11/1992 |
| GB | 2115195 | 1/1983 |
| JP | 58-105632 | 6/1983 |
| JP | 7-36035 | 5/1986 |
| JP | 4-326079 | 11/1992 |

OTHER PUBLICATIONS

Mark Moeglein et al., document, "An Introduction to Snap Track™ Server–Aided GPS Technology", 11pp, (undated).
Mark Markoff, As Seen in *The New York Times*: Deals to Move Global Positioning Technology Toward Everday Use, Article, *The New York Times*,201 1998, 1pp.

*Primary Examiner*—Yonel Beaulieu
*Assistant Examiner*—Brian J. Broadhead
(74) *Attorney, Agent, or Firm*—Shemwell Gregory & Courtney LLP

(57) ABSTRACT

In a satellite global positioning system, satellite acquisition and location assistance is based upon shared information between a GPS receiver and a remote server. Satellite position is predicted by satellite almanac data.

17 Claims, 4 Drawing Sheets

U.S. PATENT DOCUMENTS

| | | | | |
|---|---|---|---|---|
| 5,489,878 A | | 2/1996 | Gilbert | 331/57 |
| 5,504,684 A | | 4/1996 | Lau et al. | 455/3.02 |
| 5,548,553 A | | 8/1996 | Cooper et al. | 365/200 |
| 5,592,173 A | | 1/1997 | Lau et al. | 342/357 |
| 5,623,414 A | | 4/1997 | Misra | 701/207 |
| 5,625,668 A | | 4/1997 | Loomis et al. | 379/58 |
| 5,635,879 A | | 6/1997 | Sutardja et al. | 331/57 |
| 5,663,734 A | | 9/1997 | Krasner | 342/357 |
| 5,663,735 A | | 9/1997 | Eshenbach | 342/357 |
| 5,764,184 A | | 6/1998 | Hatch et al. | 342/357 |
| 5,781,156 A | | 7/1998 | Krasner | 342/357 |
| 5,786,789 A | | 7/1998 | Janky | 342/357 |
| 5,796,662 A | | 8/1998 | Kalter et al. | 365/200 |
| 5,812,087 A | | 9/1998 | Krasner | 342/357 |
| 5,825,327 A | | 10/1998 | Krasner | 342/357 |
| 5,828,694 A | | 10/1998 | Schipper | 375/208 |
| 5,831,574 A | | 11/1998 | Krasner | 342/357 |
| 5,845,203 A | | 12/1998 | LaDue | 455/414 |
| 5,854,605 A | | 12/1998 | Gildea | 342/357 |
| 5,874,914 A | | 2/1999 | Krasner | 342/357 |
| 5,877,724 A | | 3/1999 | Davis | 382/357 |
| 5,877,725 A | | 3/1999 | Kalafus | 382/357 |
| 5,883,594 A | * | 3/1999 | Lau | 342/357.1 |
| 5,884,214 A | | 3/1999 | Krasner | 701/207 |
| 5,889,474 A | | 3/1999 | LaDue | 340/825.89 |
| 5,889,492 A | * | 3/1999 | Kurby et al. | 342/357.1 |
| 5,897,605 A | | 4/1999 | Kohli et al. | 701/213 |
| 5,901,171 A | | 5/1999 | Kohli et al. | 375/200 |
| 5,903,654 A | | 5/1999 | Milton et al. | 380/49 |
| 5,907,809 A | | 5/1999 | Molnar et al. | 455/456 |
| 5,917,383 A | | 6/1999 | Tso et al. | 331/57 |
| 5,917,444 A | | 6/1999 | Loomis et al. | 342/357 |
| 5,920,283 A | | 7/1999 | Shaheen et al. | 342/357 |
| 5,923,703 A | | 7/1999 | Pon et al. | 375/209 |
| 5,926,131 A | | 7/1999 | Sakumoto et al. | 342/357 |
| 5,936,572 A | | 8/1999 | Loomis et al. | 342/357 |
| 5,943,363 A | | 8/1999 | Hanson et al. | 375/206 |
| 5,945,944 A | | 8/1999 | Krasner | 342/357.06 |
| 5,963,582 A | | 10/1999 | Stansell, Jr. | 375/200 |
| 5,977,909 A | | 11/1999 | Harrison et al. | 342/357.09 |
| 5,982,324 A | | 11/1999 | Watters et al. | 342/357.06 |
| 5,983,109 A | | 11/1999 | Montoya | 455/456 |
| 5,987,016 A | | 11/1999 | He | 370/335 |
| 5,999,125 A | | 12/1999 | Kurby | 342/357.1 |
| 6,002,362 A | | 12/1999 | Gudat | 342/357.03 |
| 6,002,363 A | | 12/1999 | Krasner | 342/357.1 |
| 6,011,509 A | | 1/2000 | Dutka | 342/357.06 |
| 6,014,101 A | | 1/2000 | Loomis | 342/357.02 |
| 6,016,119 A | | 1/2000 | Krasner | 342/357.06 |
| 6,041,222 A | | 3/2000 | Horton et al. | 455/255 |
| 6,047,017 A | | 4/2000 | Cahn et al. | 375/200 |
| 6,052,081 A | | 4/2000 | Krasner | 342/357.02 |
| 6,058,338 A | * | 5/2000 | Agashe et al. | 244/158 R |
| 6,061,018 A | | 5/2000 | Sheynblat | 382/357.06 |
| 6,064,336 A | * | 5/2000 | Krasner | 342/357.05 |
| 6,067,045 A | * | 5/2000 | Castelloe et al. | 342/357.01 |
| 6,104,338 A | | 8/2000 | Krasner | 382/357.06 |
| 6,104,340 A | | 8/2000 | Krasner | 342/357.1 |
| 6,107,960 A | | 8/2000 | Krasner | 342/357.09 |
| 6,111,540 A | | 8/2000 | Krasner | 342/357.1 |
| 6,131,067 A | | 10/2000 | Girerd et al. | 701/213 |
| 6,133,871 A | | 10/2000 | Krasner | 342/357.06 |
| 6,133,873 A | | 10/2000 | Krasner | 342/357.12 |
| 6,133,874 A | | 10/2000 | Krasner | 342/357.15 |
| 6,134,483 A | * | 10/2000 | Vayanos et al. | 342/355 |
| 6,150,980 A | | 11/2000 | Krasner | 342/357.1 |
| 6,188,351 B1 | * | 2/2001 | Bloebaum | 342/357.15 |
| 6,204,808 B1 | * | 3/2001 | Bloebaum et al. | 342/357.07 |
| 6,211,817 B1 | * | 4/2001 | Eschenbach | 342/357.03 |
| 6,211,819 B1 | * | 4/2001 | King et al. | 342/357.09 |
| 6,222,483 B1 | * | 4/2001 | Twitchell et al. | 342/357.09 |
| 6,229,478 B1 | * | 5/2001 | Biacs et al. | 342/357.03 |
| 6,239,742 B1 | * | 5/2001 | Krasner | 342/357.02 |
| 6,373,429 B1 | * | 4/2002 | Eschenbach | 342/357.03 |
| 6,411,811 B2 | * | 6/2002 | Kingdon et al. | 455/456.5 |
| 6,421,002 B2 | * | 7/2002 | Krasner | 342/357.1 |
| 6,559,793 B1 | * | 5/2003 | Eschenbach | 342/357.03 |
| 2002/0186165 A1 | * | 12/2002 | Eschenbach | 342/357.15 |

* cited by examiner

METHOD AND APPARATUS FOR DETERMINING GLOBAL POSITION USING ALMANAC INFORMATION

FIELD OF INVENTION

This invention pertains to mobile positioning using a network of satellites, specifically to computing a mobile position by predicting satellite position using almanac information.

BACKGROUND OF INVENTION

A satellite positioning system comprises a network of earth orbiting satellites to transmit geographical position information to mobile or fixed receivers.

Each satellite orbits the earth approximately once every twelve hours. The position of each satellite at any given time is precisely known and is continuously transmitted to earth. This position information, called ephemeris data, indicates the orbital position of the satellite in space with respect to satellite positioning time.

In addition to ephemeris data, the navigational signal transmitted by each satellite includes a precise timing signal in the form of a pseudo-random code specific to each satellite.

The satellite positioning system receiver computes the time taken for the satellite's timing signal to travel to a receiver to determine distance from the satellite. This computation is accomplished by comparing the receiver internally-generated timing signal to the timing signal received from the satellite and noting the time shift between the two signals. The difference in time resulting from the time shift is then multiplied by the speed of light to determine the distance of the receiver to the satellite.

The computed distance is called "pseudo-range" because receiver timing signal may not be precisely synchronized to satellite positioning system time, and because propagation through the atmosphere introduces delays into navigation signal propagation time.

Using these two pieces of information, ephemeris data and pseudo-range from at least three satellites, position of a receiver with respect to the center of the Earth can be determined using passive triangulation.

Triangulation involves three steps. First, the position of at least three satellites in view of the receiver is determined. Second, the distance from the receiver to each satellite is determined. Third, the information from the first two steps is used to determine geometrically the position of the receiver with respect to the center of the Earth.

This triangulation method, using data from three satellites, gives a rough position of the receiver. Pseudo-range calculations are dependent on the accuracy of receiver internal clock signal to be in synchronization with each of the satellite clock signals. To assure clock synchronization, a fourth satellite must be acquired by the receiver.

The process of acquiring satellite positioning system signals from a multiplicity of satellite positioning system satellites and then computing the receiver location is time consuming. This process can take from 30 seconds up to 12 minutes.

A recent U.S. Federal Communications Commission (FCC) mandate, known as "Enhanced 911" (E911) requires cellular telephone carriers to have the ability to locate the position of any cellular telephone user for emergency purposes. The time to locate or "Time to First Fix" a user location must occur within 10 seconds and must be capable of locating indoor cellular telephone users.

The prior-art satellite positioning system methods cannot provide position information within the required time of 10 seconds.

Therefore, there is a need for a method of acquiring satellite information to compute position location within the FCC's mandate of 10 seconds, that can detect receiver position located indoors and provide the required position accuracy. The present invention satisfies these needs, as well as others, and generally overcomes the deficiencies found in the prior art.

SUMMARY OF INVENTION

The invention improves time required to fix a mobile receiver with positioning signals from a satellite positioning system using almanac information.

In a differential satellite positioning system, a reference receiver, or geo-location server, continually acquires and stores satellite position information. A mobile receiver receives the stored satellite position information from the server using a high-speed radio frequency wireless link.

Since satellite information is acquired beforehand, time normally used to collect this data is therefore saved. The mobile receiver then acquires satellite pseudo-range signals to compute a position. The acquisition phase is much faster, as the correlation peak offset to a known time reference is accurately known, and the energy search time is shortened significantly.

In operation, the server sends to the mobile receiver, via the wireless link, approximate position within 20 km of the real position along with the approximate satellite position system absolute time.

Using the approximate position of the mobile receiver, the approximate satellite position system absolute time and the mobile receiver internally stored almanacs, the mobile receiver computes a tentative list of visible satellites.

The mobile receiver then sends to the server, via its wireless link, information relating to which satellites are in tentative visibility list and identification of corresponding almanacs.

The server correlates this data with internally stored almanacs to determine if there is a position or time error as compared to current satellite ephemeris. If there is a position or time error greater than a predetermined threshold, or with an almanac unknown or unavailable to the server, or a satellite not visible from the mobile receiver approximate location, the server sends a replacement almanac to the mobile receiver via the wireless link.

Since the satellite visibility list has been updated at the mobile receiver using replacement almanacs from the server and not from the satellites directly to the mobile receiver, the prior-art time consuming satellite acquisition phase is eliminated. The pseudo-random code offset, broadcast bit boundary offset, approximate Doppler and all information necessary to ensure fast acquisition is computed at the mobile receiver using the combination of almanacs updated by the server and almanacs currently residing the mobile receiver memory.

The mobile receiver acquires pseudo-ranges from the satellites and uses almanacs stored in memory to compute a coarse position. The coarse position is sent to the server with residuals for each satellite using a wireless link.

The server computes the position of the satellites using the same almanacs stored in the mobile receiver at the time that the coarse position was computed. Using the coarse mobile receiver position, accurate satellite ephemeris data from the base station and residuals, the server corrects the coarse location and computes an accurate location.

DETAILED DESCRIPTION

An almanac is a list of orbit Kepler parameters for all of the satellites operating in a satellite positioning system.

A sub-almanac is a subset of an almanac and contains only the orbit and clock parameters for a single satellite. Complete GPS almanac information is assembled from broadcast data obtained from any satellite by receiving a 12 second message every thirty seconds for a total of twelve minutes. A sub-almanac can be retrieved by receiving any 12 second message within the 12 minute broadcast. Each sub-almanac is identified by a unique identification.

The Kepler parameters are used to compute a satellite position to an accuracy of approximately one kilometer to its actual location and is valid for a period of one week from the reference time contained in the almanac.

Included in an almanac is a list of ephemeris data for each satellite. Ephemeris data contains satellite position information of higher accuracy and is in the order of five to ten meters of its actual location. However, the validity of the data lasts for only 4 hours. The data is broadcast from a satellite for eighteen seconds for every 30 second period.

Figure 1:
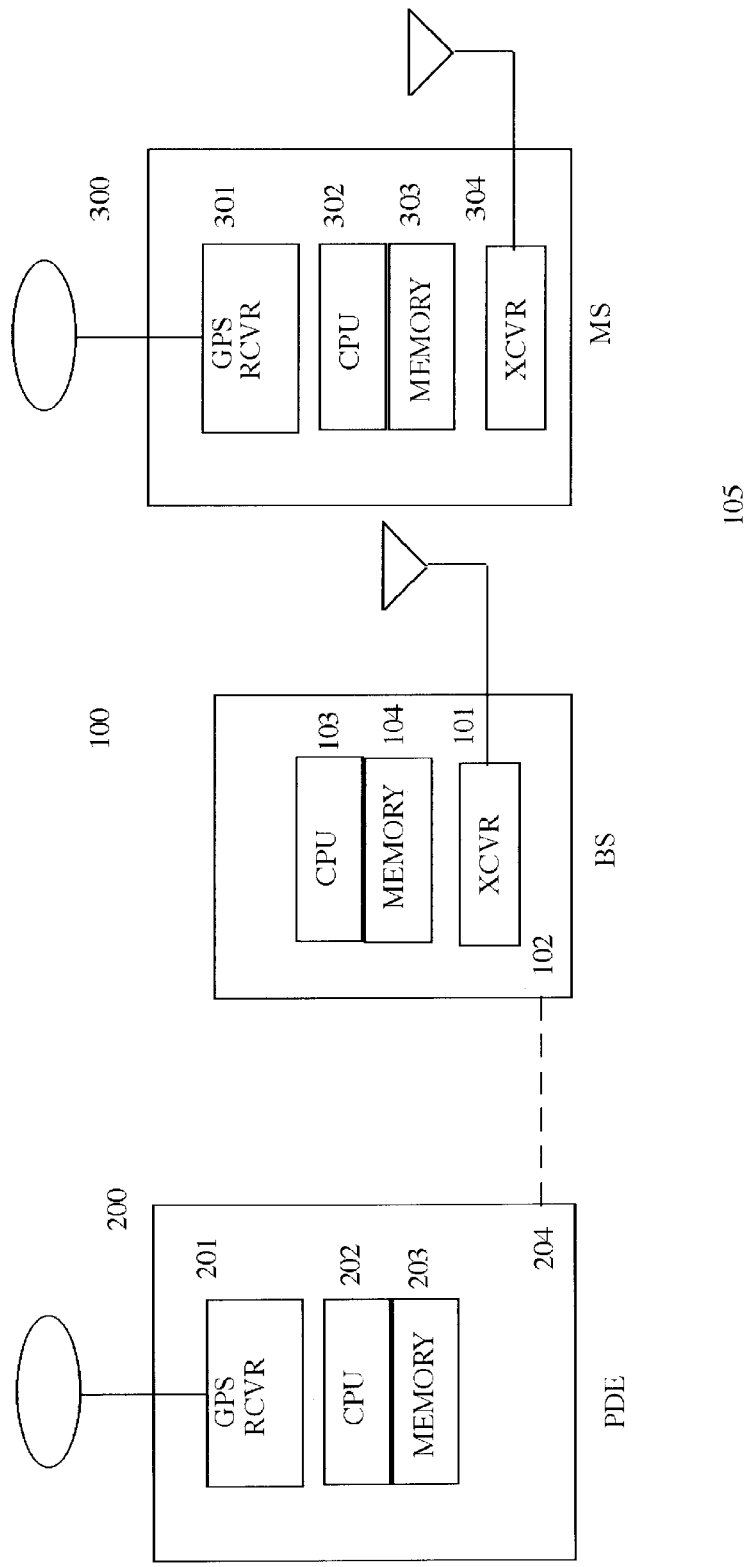
FIG. 1 is a block diagram of the system.

FIG. 1 shows a block diagram of the apparatus that includes a portable or fixed Base Station (BS) 100, a portable or fixed Position Determining Entity (PDE) 200 and a portable or fixed Mobile Station 300 (MS).

BS 100 comprises a wireless transceiver 101 and a landline digital interface 102. BS 100 is fixed at a predetermnined geographical location.

Position determining entity ("PDE" or location servers) 200 comprises a global positioning receiver 201, digital computing device 202, data storage memory 203, and a landline digital interface 204. The PDE 200 acts as a data server form the BS to the MS.

MS 300 comprises a global positioning receiver 301, a computing device 302, data storage memory 303 and a wireless transceiver 304. The MS 300 has sub-almanac data stored in memory although the data may not be a complete almanac.

PDE 200 establishes communication with a satellite using its GPS receiver to receive almanac data. A complete almanac comprising orbit parameters for a plurality of satellites within the positioning system constellation is stored in memory in the PDE. PDE computes geographical location using the most recently acquired ephemeris data.

Figure 2:
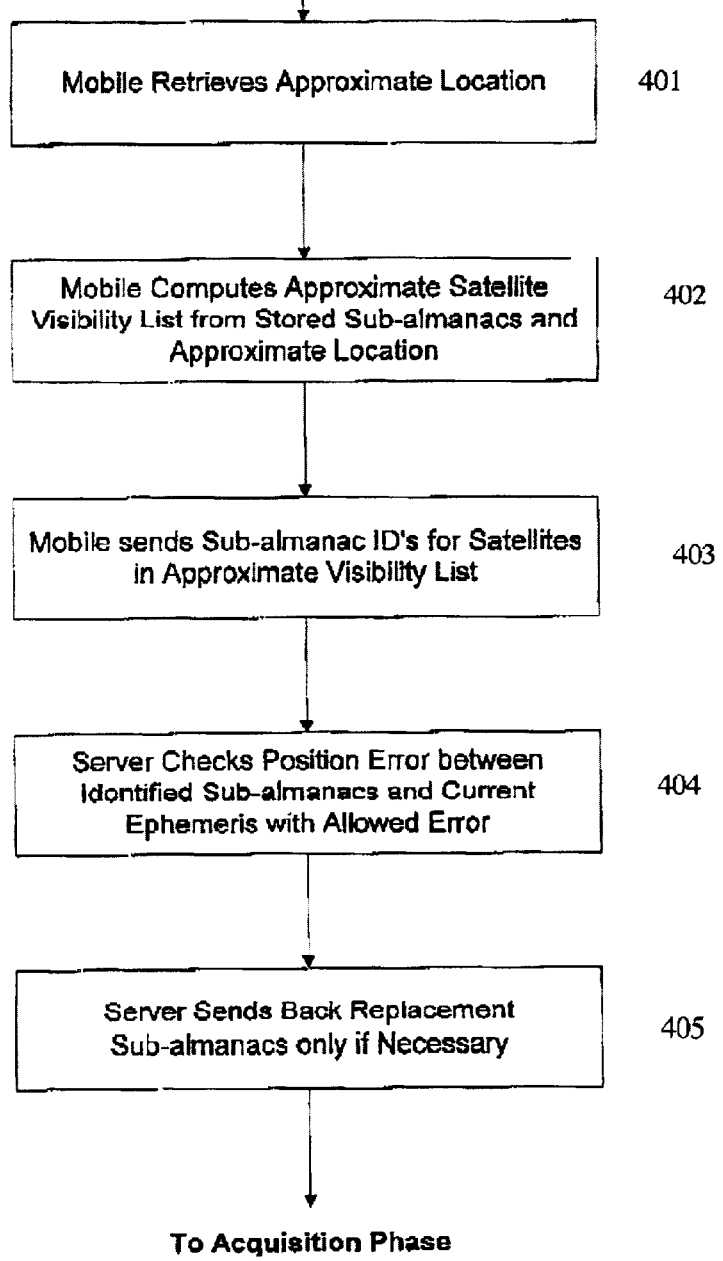
FIG. 2 is a flow diagram of the negotiation phase.

FIG. 2 shows a flow diagram of the negotiation phase 400. In the negotiation phase 400, the MS 300 computes a tentative satellite visibility list using a known geographical location of a BS 100 and almanacs currently stored in a memory 302 of the MS 300. This is depicted in blocks 401–402. The MS 300 sends to the PDE 200 sub-almanac information that is used in the computation of the tentative satellite visibility list, as shown in block 403. The MS 300 also sends a computed error parameter MAX_ALL_ERR, indicating the position plus satellite clock error that the MS 300 expects returned after the almanac data has been corrected by the PDE 200.

The PDE 200 computes the satellite position error between the actual satellite location from ephemeris data received from the MS 300 and the sub-almanacs contained in the satellite visibility list computed by the MS 300. This is depicted in block 404. If the error is larger than the MAX_ALL_ERR, the PDE 200 sends replacement sub-almanacs representing current satellite data only for sub-almanacs that exceeded MAX_ALL_ERR 405 to the MS 300. The PDE 200 computes a true satellite visibility list using complete almanac data. If a satellite contained in the true visibility list is not listed in the tentative list, an almanac for the missing satellite is sent to the MS 300, as depicted in block 405.

If the MS 300 is unable to establish a communication link with the BS 100, the MS 300 computes a geographical location using almanac data stored in the MS 300 and acquired satellite position information acquired by GPS receiver 301 contained in the MS 300.

Figure 3:
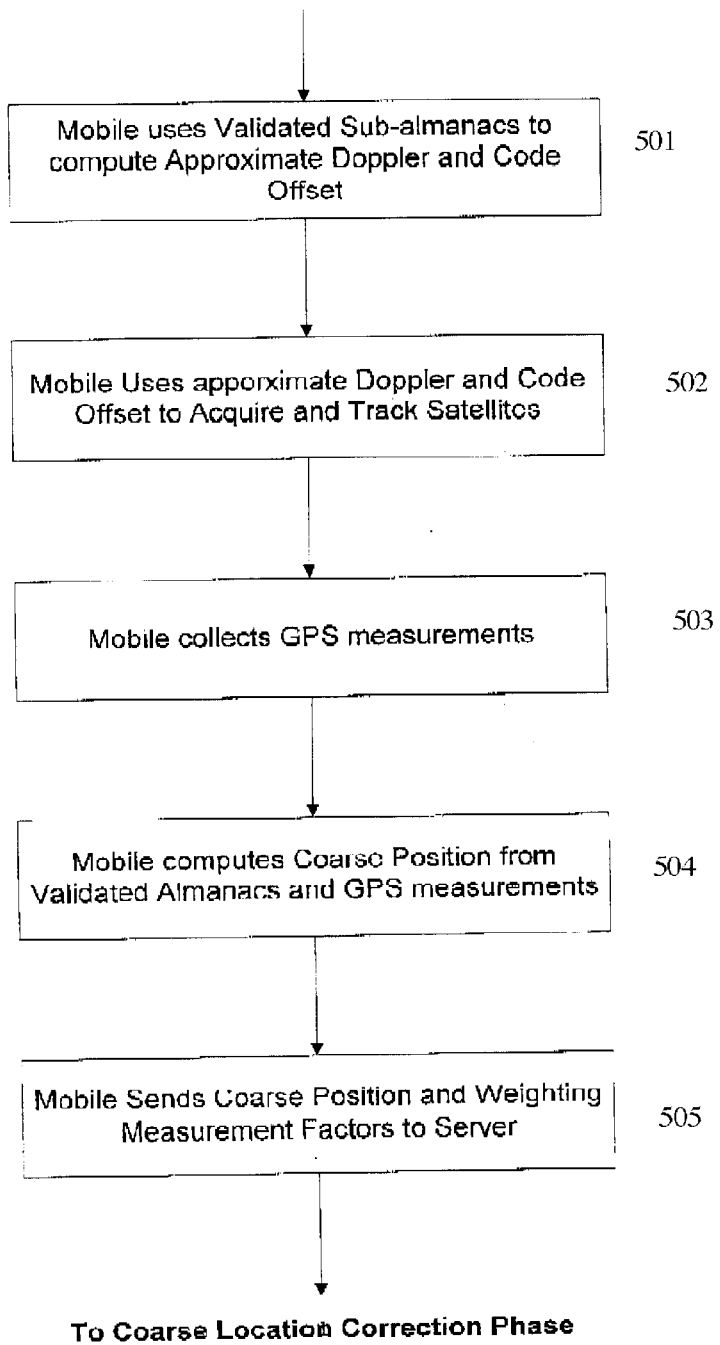
FIG. 3 is flow diagram of the acquisition phase.

FIG. 3 shows a flow diagram of the acquisition phase 500. In the acquisition phase 500, the MS 300 computes detailed acquisition information. The MS 300 updates the satellite visibility list using the replacement sub-almanacs received from the PDE 200 to compute approximate Doppler and code offset data , as shown in block 501. The MS 300 uses the approximate data to acquire and track satellites, as shown in block 502. The MS 300 acquires satellite position information (as shown in block 503) using the GPS receiver 301 contained in the MS 300 and computes a coarse geographical location using the satellite positions and updated sub-almanac data, as shown in block 504. The MS 300 sends the computed location difference between the MS 300 and the BS 100 to the PDE. In one embodiment, the information sent from the MS 300 to the PDE 200 includes a weighted measurement factor, as shown in block 505.

Figure 4:
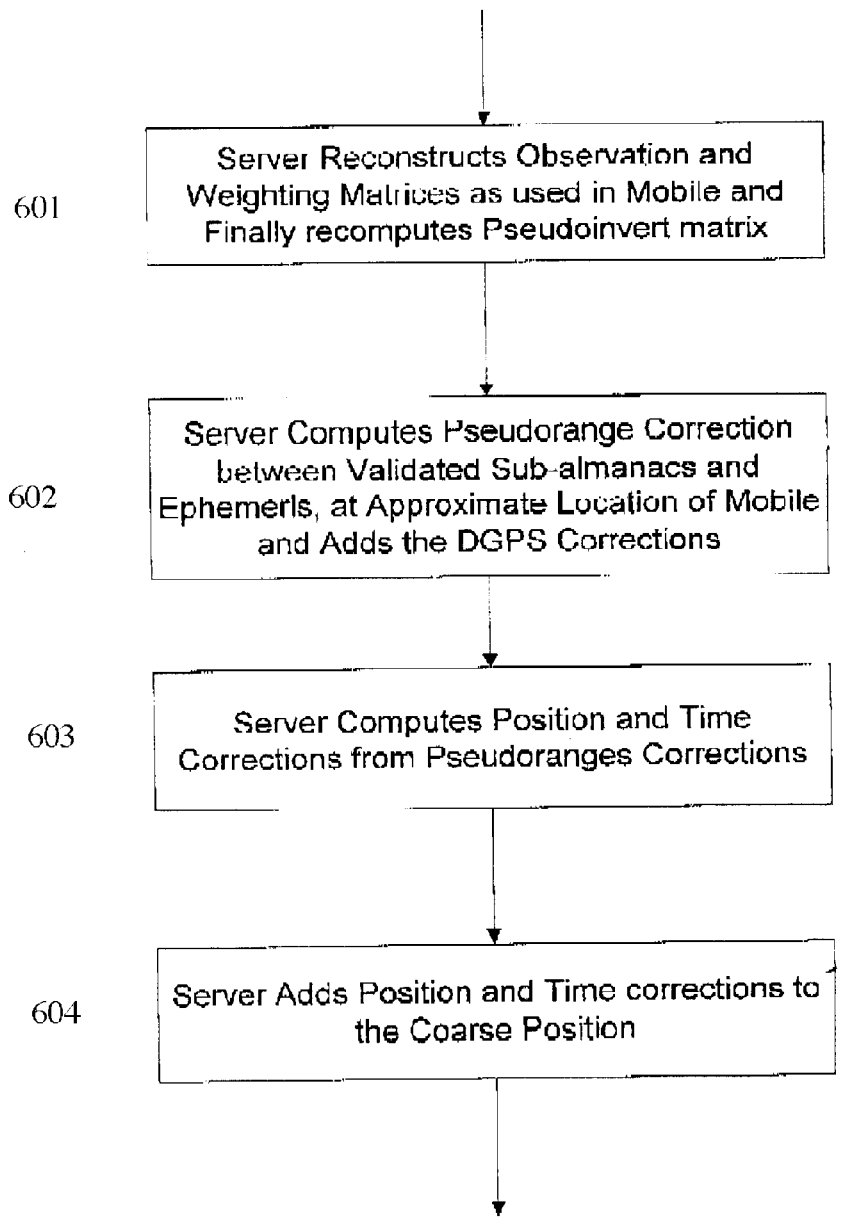
FIG. 4 is a flow diagram of the coarse correction phase.

FIG. 4 shows a flow diagram of the coarse correction phase. In the coarse correction phase 600, the PDE 200 corrects the coarse location information from the MS 300 and computes an accurate location of the MS 300. The PDE 200 reconstructs the data sent to it from the MS 300, as shown in block 601, computes a correction factor from the sub-almanacs in the visibility list and the ephemeris data, as shown in block 602, computes position and time corrections from ephemeris data, as shown in block 603, adds position and time correction to the coarse location, as shown in block 604, and sends the corrected location information to the MS 300.

What is claimed is:

1. A method for determining a location of a mobile station, comprising:

the mobile station computing a tentative satellite visibility list using stored satellite almanac information, wherein the stored satellite almanac information includes a plurality of sub-almanac identifications;

the mobile station transmitting the tentative satellite visibility list and the sub-almanac identifications to a location server;

the mobile station transmitting a computed maximum error parameter to the location server;

the location server calculating at least one actual error between at least one satellite position calculated using the sub-almanac information indicated by the sub-almanac identifications, and at least one satellite position calculated using current ephemeris data; and the location server transmitting replacement sub-almanac information to the mobile station if an actual error exceeds the maximum error parameter.

2. The method of claim 1, further comprising the location server transmitting a reference position to the mobile station.

3. The method of claim 2, further comprising:
the mobile station computing coarse position information using the stored almanac information and any replacement sub-almanac information received; and
the mobile station transmitting the coarse position information to the location server.

4. The method of claim 3, further comprising the mobile station transmitting a position difference to the location server, wherein the position difference comprises a difference between a position calculated by the mobile station and the reference position.

5. The method of claim 3, further comprising the location server calculating pseudorange corrections to the coarse information using ephemeris data.

6. The method of claim 5, further comprising:
the location server calculating position corrections and time corrections using the pseudorange corrections; and
the location server using the position corrections and time corrections to calculate a corrected coarse position.

7. The method of claim 6, further comprising the location server sending the corrected coarse position to the mobile station.

8. The method of claim 1, further comprising,
the location server computing a true satellite visibility list using complete almanac information; and
if the true satellite visibility list includes a sub-almanac not included in the tentative satellite visibility list, transmitting the sub-almanac to the mobile station.

9. A system for determining a position of an object, comprising:
a mobile station comprising a global positioning system ("GPS") receiver, wherein the mobile station is configured to compute an approximate GPS satellite visibility list from stored sub-almanacs; and
a position determining entity ("PDE") communicatively coupled to the mobile station, wherein the PDE is configured to receive almanac and ephemeris data, the PDE comprising,
a memory device for storing almanac data and ephemeris data; and
a central processing unit configured to,
calculate an error between a position calculated using the ephemeris data and a position calculated using sub-almanac data received from the mobile station; and
transmit a replacement sub-almanac to the mobile station if an error calculated using a sub-almanac is greater than a pre-determined value;
wherein the mobile station uses the stored sub-almanacs, any replacement sub-almanacs received, and GPS measurements to compute a coarse position.

10. The system of claim 9, wherein the mobile station further uses the stored sub-almanacs and any replacement almanacs received to compute approximate Doppler offset and code offset information.

11. The system of claim 10, wherein the mobile station further uses the approximate Doppler offset and code offset information to acquire and track GPS satellites.

12. The system of claim 9, wherein the mobile station transmits the coarse position and at least one weighting measurement factor to the PDE.

13. The system of claim 12, wherein the PDE computes a position difference between a position calculated using the almanac data and a position calculated using the ephemeris data.

14. The method of claim 13, wherein the computed difference includes a differential GPS correction.

15. The system of claim 14, wherein the PDE corrects the coarse position using the computed difference.

16. An electromagnetic medium containing instructions which, when read by a processor, cause the processor to:
calculate a position using ephemeris data;
calculate a position using sub-almanac data received from a mobile unit;
calculate an error between the positions calculated; and
if the error exceeds a pre-determined error value, sending a replacement sub-almanac to the mobile station for each sub-almanac associated with the error, wherein the replacement sub-almanac is stored with other sub-almanacs as a set of validated sub-almanacs used by the mobile station to calculate a coarse position.

17. The electromagnetic medium of claim 16, wherein the instructions, when read by a processor, further cause the processor to:
receive the coarse position from the mobile station;
compute a pseudorange correction between a position calculated using the validated sub-almanacs and ephemeris data, including consideration of differential GPS corrections;
compute position and time corrections from the pseudorange corrections; and
include the position and time corrections in the coarse position.

* * * * *